3,061,924
PRODUCTION OF INTERNALLY CLADDED
LAMINATE METAL STOCK
Robert M. Brick, Hinsdale, Ill., and Emery I. Valyi,
New York, N.Y., assignors to Continental Can Company, Inc., New York, N.Y., a corporation of New York
Filed Mar. 6, 1959, Ser. No. 797,790
12 Claims. (Cl. 29—528)

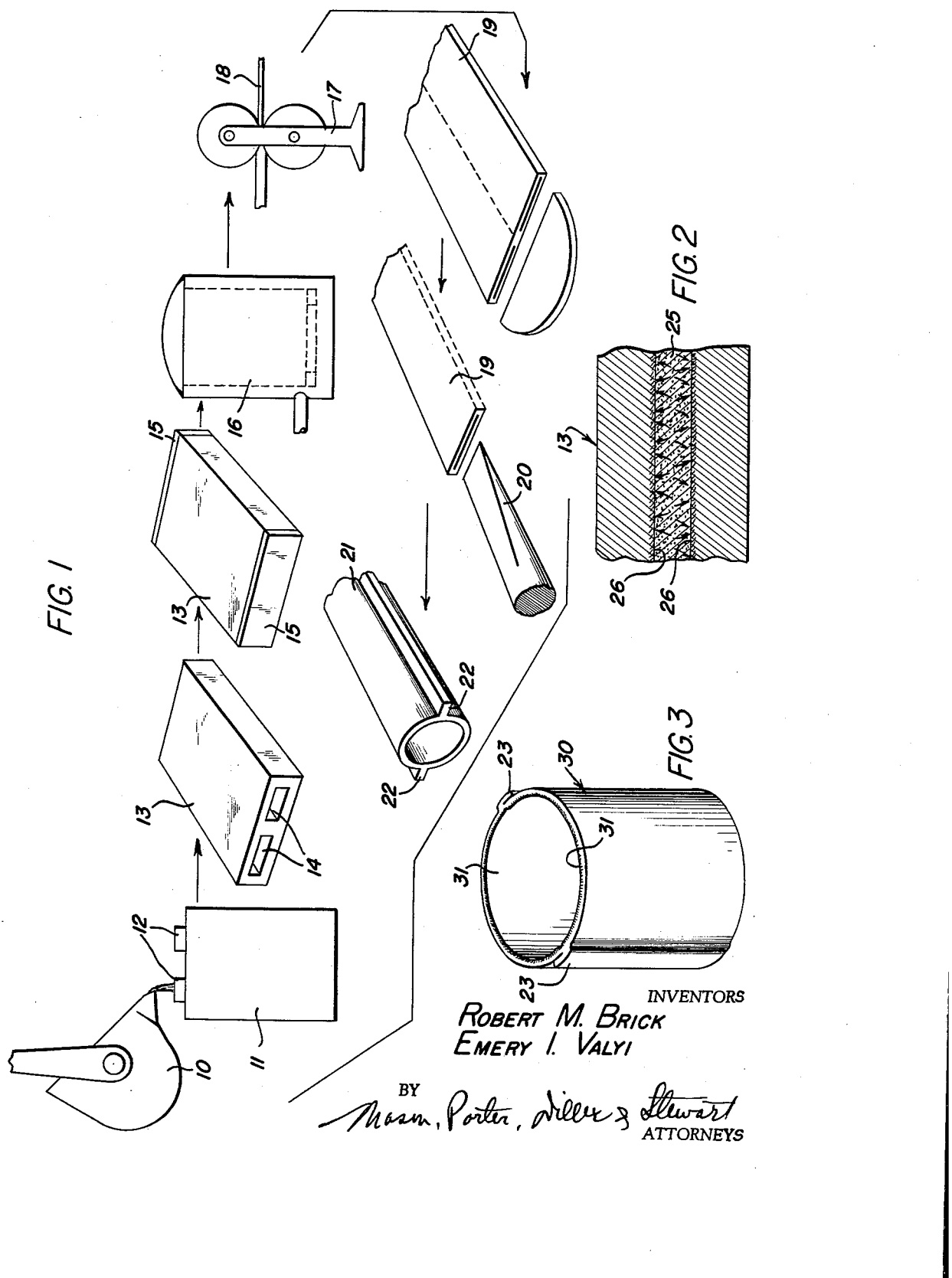

This invention relates to the production of a laminate material having non-adherent internal portions so that surface laminae may be opened out or separated to provide a tubing while the said surface laminae continue integrally joined, and is particularly concerned with the provision of cladding of the internal surfaces of the separable areas, and products produced thereby.

It is known to produce a tubular structure by rolling a billet having a channel therein, until the thickness of the rolled strip approximates double the wall thickness of the tubing to be made, with provision during the rolling operation for preventing welding at the region which is later to be opened to form the internal hollow of the tubing.

When such a tube is used as a conduit, a container body, etc., it is frequently desirable to have the internal surface protected against the substances which are to be within the tubing. It is already known to provide such a coating of a metal in several fashions; and the operation of coating such as a metal is referred to as "cladding" and the coated product so produced is referred to as a "cladded" or "clad" metal, and the surface layer as a "cladding layer." Among the methods of producing clad metals are those of roll bonding a sheet of stainless steel to a sheet of mild steel, or a sheet of strong aluminum alloy to a sheet of pure aluminum or low alloy aluminum; and the casting of a liquid alloy against a solid slab of body metal, and then rolling the composite. When these methods are employed in preparing tubing by the above procedure, with internal cladding, the cladding layer of one sheet is brought against the cladding layer of another sheet and the parts are then bonded by rolling, or an alloy slab as above is likewise welded to a second like alloy slab. In each instance, the cladding layer is at the abutting surfaces: and while these surfaces may be held separate by an anti-weld material present for a defined area, during rolling, yet the alloy layers extend to the exterior and render the projecting fins of the final tube non-homogeneous and hence without the same general characteristics as the body metal which forms the major portions of the body walls.

According to the present invention, the internal wall surface of such a tubing is provided with a cladding layer during the course of its manufacture, and with maintenance of a homogeneous integral structure of the body metal around the cladding layer.

One of the objects of the invention is the procedure of making a laminate material having non-adherent internal portions with cladding of the internal walls of the channels at such portions.

Another object of the invention is the making of a tubular structure having its external surface provided by homogeneuos body metal integrally joined around the periphery, and with the presence of an internal alloy cladding layer firmly adherent and fixed to the body material.

A further object of the invention is the production of an article in the form of a hollow body having its external surface of homogeneous integrally joined metal and having an internal cladding layer formed of an alloy of the body material by diffusion of another metal or metals thereinto.

With these and other objects as features in view, illustrative practices of the invention will be set out, for exemplifying the empolyment at the non-adherent internal portions or channels of a laminate stock of a substance, herein called "cladding material" which has the dual functions of preventing welding of the body material at such areas, and of delivering metal atoms to the body metal for alloying therewith and thereby establishing a cladding layer. This delivery of metal atoms to the internal wall of such a channel containing the cladding material can be accomplished in various ways such as the simple breakdown of an oxide, the vaporization of a metal powder or compound with deposit from the vapor of a metal at the internal channel surfaces, and the employment of metals which have significantly high vapor pressures at the temperatures of operation.

According to the present invention, the temperatures employed in preheating, rolling, and annealing the billet and strip are utilized for delivering the energy necessary for provoking and maintaining the operation for production and transit of vapor to contact with the internal walls of the channel.

*Example 1*

Cladding layers may be formed and bonded to the layers of body material by chemical change as defined by the equilibrium constant under the conditions of the procedure.

Illustratively, when it is desired to provide a laminate structure having outer or body layers of an iron base such as mild steel of low carbon content, with internal non-adherent regions between the laminae and these regions having cladding layers at both surfaces composed of elemental nickel as such or in the form of an alloy, the procedure can include the use of a nickel oxide such as NiO, $Ni_2O_3$ or $Ni_3O_4$. Employing the usual chemical notations, these oxides are competent of the following reversible reactions:

I. $\quad NiO \rightleftharpoons Ni + \frac{1}{2}O_2$

II. $\quad Ni_2O_3 \rightleftharpoons \frac{1}{2}O_2 + 2NiO$

III. $\quad 3NiO \rightleftharpoons Ni + Ni_2O_3$

IV. $\quad 3Ni_3O_4 \rightleftharpoons Ni + 4Ni_2O_3$

V. $\quad Ni_2O_3 \rightleftharpoons 2NiO + \frac{1}{2}O_2$

Equations I and II together represent a step-wise change, shown as a single equation at III. The corresponding equations denoting the mass-action equilibrium constants at a fixed temperature:

I. $\quad K = [Ni] \times \frac{[O_2]^{1/2}}{[NiO]}$

II. $\quad K = [NiO_2] \times \frac{[O_2]^{1/2}}{Ni_2O_3}$

III. $\quad K = [Ni] \times \frac{[Ni_2O_3]}{[NiO]^3}$

IV. $\quad K = [Ni] \times \frac{[Ni_2O_3]^4}{[Ni_3O_4]^3}$

V. $\quad K = [NiO]^2 \times \frac{[O_2]^{1/2}}{[Ni_2O_3]}$

The equations for the mass-action equilibrium constants are stated as for a fixed temperature. In general, the value of K varies with temperature, the effect being indicated by the thermodynamic equation:

$$\Delta F = -RT \log K$$

noting the $\Delta F$ must be negative for the reaction to progress. It may also be noted that the rate of a reaction is not determined by the thermodynamic quantity K, and that the over-all rate of the possible and coupled reactions is determined by the slowest; among the factors are:

(a) Decomposition of the oxide, e.g. NiO and the formation of oxygen in Equation I;
(b) Oxidation of NiO to $Ni_2O_3$, in Equation I–A;
(c) Absorption of Ni by the steel.

Thus, if appreciable air is present in porosities of the mass of resist in the channel, step (a) may be the slowest due to a low differential in oxygen pressure, i.e. the partial pressure in the air delays the rightward progress in Equation I although accelerating the rightward progress in Equation I–A. In another case, the slowest reaction may be that of step (c), noting that the metallic nickel is generated throughout the mass, and the nickel molecules must migrate to the steel surface before the absorption can occur.

In general, temperature is the major factor in determining reaction rate: the speed of reaction increasing as the temperature rises. The usual preheating and soaking times and temperatures, hot rolling times and temperatures, and annealing times and temperatures, of usual mill procedure, produce an adequate amount of nickel for the intended effect, and the amount of nickel taken up by the steel is a function of all these temperatures and times.

Normally and in the original absence of end products, each of these reactions proceeds until the numerical value of the constant K, which is characteristic for the particular temperature involved, is attained: that is, a stable condition is attained and continues while the material is at such temperature. However, at the regions where the material is present, nickel atoms are being released by the reactions of Equations I, II and III and are brought into contact with the internal surfaces of the body layers, which in this illustration exhibit metallic iron with which the nickel can form an alloy, whereupon such alloy is formed and there is diffusion of the nickel into the crystalline structure of the iron from the surface inward. Therewith the concentration of nickel in the confinement space is reduced, so that this removal of a product of the reaction permits the reaction to proceed and more metallic nickel is formed, and the alloying effect continues until an intended thickness of alloy is established.

In practice, with the reaction occuring within the resist material, the liberated oxygen atom is essentially nascent and immediately joins an adjacent nickel oxide molecule to increase valency, and is thereby fixed.

In practice, a billet of the body metal, illustratively the mild steel, is made by drilling a hole or parallel holes in an ingot or billet which are then charged with the cladding material, by casting the steel around a core or parallel cores containing the cladding material, or by applying the cladding material to restricted areas of a first steel plate and face-welding a second steel plate to the first at the non-coated areas. The result is a billet having external surfaces provided by the body metal, with internal channels containing the cladding material, for example one of the above nickel oxides. In practice, it is preferred to mix the nickel oxide powder with an inert substance competent of preventing welding at the channel areas: powdery aluminum oxide or titanium oxide can be employed, which are not attacked by the reaction products. The ends of the billet may be sealed by crimping together and welding, by welding sealing blocks of mild steel over the channel ends, or by avoiding application of the cladding material at the ends of plates so that these are welded closed during the assembly of the plates. This billet is then preheated and heat-soaked, then rolled, and annealed at temperatures appropriate to the body metal for producing a strip of the desired thickness. This strip product is a laminate structure of essentially the original width and having surfaces of the body metal provided by laminae thereof, with these laminae integrally joined at areas not contacted by the cladding material. During the preheating and soaking for rolling, the hot-rolling and the heat treatments, a chemical reaction occurs as set out above, and the contact areas become coated with nickel which alloys with the underlying body metal and is tightly adherent thereto. The strip can be cut to length, and opened out or expanded to form a tube employable as a conduit, a container body, or the like. The residue of the cladding material can be removed by upending and rapping the tube, by flushing or brushing, or by like removal operations.

As a specific example with NiO, a billet was prepared with mild steel laminations 0.5 inch thick, with a resist core 0.060 inch thick enclosed between them; the resist being composed of 67 percent $Al_2O_3$ and 33 percent NiO. A mill schedule was set up of:

(1) Heating to rolling temperature of 2000 degrees F. in 20 minutes;
(2) Hot-rolling to 0.125 inch thick in about 2 minutes, the temperature dropping to about 1000 degrees F.;
(3) Annealing for about 2 hours at 1600 degrees F., followed by slow cooling;
(4) Cold-rolling, with two or three intermediate anneals at about 1300 degrees F., to a final thickness of 0.012 inch (about 0.006 inch lamination or wall thickness);
(5) Annealing at 1300 degrees F.;
(6) Temper-rolling with a one-percent reduction.

Whereupon the internal surfaces of the laminations showed the presence of nickel in adherent form, apparently as a gradient alloy with the steel.

Chromium occurs as the oxides CrO, $Cr_2O_3$, $CrO_2$, $CrO_3$, etc.: each of which likewise has an equilibrium condition at the temperature of operation, with a corresponding mass-action equilibrium constant, so that elemental chromium is formed. Such oxides can be employed in preparing a cladding material, with or without an inert component, with the result of producing a tubular body having an internal cladding containing chromium, with the chromium forming an alloy with the iron and providing an adherent cladding having a gradient of chromium concentration from the nearly zero content of the steel to a maximum at the exposed surface.

As a specific example with CrO, a billet was prepared with mild steel laminations 0.5 inch thick, with a resist core 0.060 inch thick enclosed between them; the resist being composed of 67 percent $Al_2O_3$ and 33 percent CrO. Upon subjection to the mill schedule set out above, a surface deposition of chromium, with alloying, had occured.

Mixtures of oxides, such as a mixture of NiO and CrO can be employed, wherewith an internal cladding corresponding to a NiCr stainless steel is provided: noting that the mixed oxides can be prepared with an inert powder as before.

The rolling operation serves to reduce the total thickness of the original billet to the desired strip thickness, and therewith a proportionate reduction of the thickness of the core of cladding material occurs; and this extension is coupled with the bringing of unreacted oxide particles closer to and in contact with the surface of the body metal and the already-deposited coating thereon, so that the coating operation continues during the hot rolling.

*Example 2*

The coating metal need not be derived solely from the thermal chemical reaction, as a cladding material can be provided which contains a component for aiding the migration or diffusion of the cladding element within the channel.

Thus, a powder of the cladding metal or metals can be employed, or a compound thereof, together with a reactive agent which forms a metallic compound vapor permeating the particles. For illustration, a cladding material composed of 5 to 20 parts by weight of chromium powder, 1–3 parts of chromium chloride and 80–90 parts of an inert powder such as aluminum oxide or titanium oxide can be employed as before, with sealing of the ends of the billet to prevent access of atmospheric oxygen. In a specific example, 3 parts of chromium powder and 20 parts of chromium dichloride powder were thoroughly mixed with about 75 parts of aluminum oxide powder: with a product exhibiting internal cladding and easily opened or expanded by moving the laminations apart. During preheating, hot rolling and annealing, reactions occur:

V. $CrCl_3 \rightleftarrows CrCl_2 + Cl$

VI. $2Cl + Cr \text{ (powder)} \rightleftarrows CrCl_2$

VII. $CrCl_2 + Fe \text{ (inner surface)} \rightleftarrows FeCl_2 + Cr$

The elemental chromium then dissolves in and alloys with the steel. The degree of alloying at the surfaces of the internal channels is determined by the powder mixture and, more importantly, by the time, temperature and deformation of the billet during the heating operations, and by the carbon content of the steel. Accordingly, for commercial manufacture of cladded steel container bodies by this method, it is preferred to have a carbon content of about 0.04 to 0.12 percent. Such chrome deposit to a depth of one or two thousandths of an inch can be attained in the time required for the heating and rolling operations. Such thicknesses are sufficient for a high resistance to corrosion, with a stainless steel characteristic. The deformation during the hot rolling accelerates the production of the desired thickness both by rate of deposition of chromium thereon and the diffsion of the chromium into the body metal, i.e. the mild steel.

This example illustrates the employment of a cladding material comprising a metallic powder, a source of carrier gas, and an inert anti-weld powder, in conjunction with a body metal receptive of the metal of such powder, acting under the conditions of heating and thickness reduction of the composite billet. The metallic powder for the cladding should be of an element which will alloy with the body metal, being soluble therein in the solid state, and conferring the desired characteristics upon alloying. In general, with iron as the major metal component of the body metal, the transitional elements of the fourth, fifth and sixth periods of the Periodic Table can be used, noting that of these chromium and nickel are cheap and confer desirable properties.

*Example 3*

When the metal which is to be deposited for cladding has a sufficient vapor pressure at the hot rolling temperatures for the body metal, a carrier gas need not be employed as in Example 2.

As an illustration, when the cladding layer of an aluminum tube is to contain zinc, the cladding material mixture can comprise zinc powder and an anti-weld component inert to the zinc vapor such as aluminum oxide or titanium oxide. The billet is formed with its channels containing the cladding material and its ends sealed. During the heating and rolling, zinc sublimes and deposits as a coating on the channel walls. Aluminum or manganese powders can be similarly employed with steel body metal. Upon heating, the metal powder quickly reacts with residual gases, such as oxygen, in the pores of the material, and the rest of the metal powder then provides the desired coating while the inert admixed powder prevents welding at the channel areas. The metal powder may melt at the temperature of operation, e.g. zinc, but the droplets are held dispersed by the inert powder, and continue to maintain the metal vapor pressure at a level for the desired coating: for example, zinc melts at 787 degrees F., whereas a desirable hot-working temperature for aluminum alloys is in the range of 800 to 950 degrees F. When the individual zinc atoms of the metal vapor strike the aluminum surface, they immediately adhere, forming an alloy and diffusing into such body metal; the metal vapor pressure drops by the removal of such atoms from the channel space, and additional zinc vaporizes. Ultimately, if the temperature is maintained within the stated range for zinc, the metallic zinc disappears from the anti-weld material, largely depositing on and in the body metal with a minor portion maintaining a partial vapor pressure of zinc within the channel space to prevent re-evaporation from the cladding coating. Other metals, at their individual proper temperatures, behave in like fashion, e.g. aluminum powder in a cladding material in a composite steel billet. Thus, for a given desired effect, a corresponding quantity of the metal powder can be mixed in the cladding material, and the heating conditions and times adjusted to assure its major exhaustion from such material into the body metal.

With a steel billet, and aluminum metal powder in the cladding material, the billet can be heated and hot rolled at about 2200 degrees F.; the aluminum melts at 1220 degrees F., and forms dispersed droplets in aluminum oxide powder forming an anti-weld component of the material, with an appreciable vapor pressure at the rolling temperature. The aluminum vapor diffuses into the steel and can form a cladding alloy layer containing up to 20 percent of aluminum as a solid solution, with a corrosion-resistant characteristic which is uniquely valuable for certain container employments. It may be noted that aluminum forms certain brittle compounds with iron, e.g. $FeAl$, $Fe_2Al_5$, $FeAl_3$, these are molten at temperatures below 2200 degrees F., so that they do not leave the system and prevent the formation of the solid-solution condition stated.

In each of the examples, the procedure may be accomplished mechanically as shown by the attached drawings, in which:

FIG. 1 is a conventional diagram of the preparation of an internally cladded laminate strip stock from a composite billet, and the formation of a tube therefrom.

FIG. 2 is a section through such a strip, on a greatly enlarged scale, showing the formation of a cladding coating during hot-rolling.

FIG. 3 is a perspective view of a tubular structure made according to the invention.

In these drawings, FIG. 1 shows the pouring from a ladle 10 of an ingot in a mold 11 having a number of cores 12 which are removed after cooling, to provide a billet 13 having corresponding parallel channels 14. These channels 14 are then filled with a cladding material as set out above, and the ends closed by sealing plates 15 of the body metal which are welded in place. This billet is then preheated in a furnace 16, and hot-rolled in the roll stand 17, preferably with multiple passes, until the thickness is reduced to a dimension double the thickness of the intended tube wall, with allowance for the residual thickness of the cladding material, and forms a strip 18. In practice, the body metal and the cladding material are extended at the same rate, with little increase of width; so that the thickness of the cladding material maintains its proportion to the over-all thickness. After cooling, the strip 18 can be cut transversely, for exposing the residue of the cladding material and providing a blank 19 of desired length. A mandrel tool 20 can be introduced at one end, and passed through the tube, to give it a cylindrical form 21 if such is desired, with the projecting fins 22 which can be trimmed and bent to position along the outer tube surface, if desired, as shown by the article 23 in FIG. 3.

During the hot operations, the atoms of cladding metal within the cladding material can migrate in vapor phase as indicated by arrows in the cladding material 25, FIG. 2. Upon encountering the wall surfaces 26 of the channel which contains the cladding material 25, the aforesaid deposition, diffusion, and alloying occurs: so that, as shown in FIG. 3, the article 30 has an outer surface provided by the body metal, and an internal cladding 31 formed from the cladding metal alloyed with the body metal.

It is obvious that the invention is not restricted to the practices shown and described, but that it may be employed in many ways within the scope of the appended claims.

We claim:

1. The method of producing a laminate strip having surface layers of base metal with cladding alloy at inner surfaces thereof and having within the cladding a layer of anti-welding material, said base metal layers being integrally joined together at areas not contacted by the cladding metal, which comprises preparing a billet of the base metal and having a sealed cavity therein, said cavity containing a powdery mixture of inert refractory powder and of a cladding metal element competent of dissolving into the base metal while the latter is in the solid state and of forming an alloy therewith, said cladding metal element being present in a form providing a vapor at the hot-rolling temperature of the base metal, heating the billet to hot-rolling temperature for the base metal and hot-rolling the billet whereby to extend the area and reduce the thickness of the billet metal and the powdery mixture, and therewith provoking transition of the cladding metal of the mixture in vapor form toward the walls of said cavity and the deposit of the said cladding metal of said walls in elemental form, the billet and strip being maintained during the heating and hot-rolling for a time and at a temperature for effecting diffusion of the cladding metal atoms into the base metal and forming an alloy therewith.

2. The method as in claim 1, in which the cladding element is present in elemental form in the powdery mixture and also in the form of a compound which decomposes at the temperature of the hot-rolling and therewith deposits elemental metal on the walls of the cavity and evolves a gas reactive with the elemental metal in the powdery mixture to form a vapor containing the metal in combined form.

3. The method as in claim 1, in which the billet base metal is aluminum and the cladding metal is elemental zinc.

4. The method as in claim 1, in which the billet base metal is steel, and the cladding metal is elemental aluminum.

5. The method as in claim 1, in which the billet base metal is steel, and the cladding metal is elemental manganese.

6. The method of producing a laminate strip having surface layers of base metal with cladding alloy at inner surfaces thereof and having within the cladding a layer of anti-welding material, said base metal layers being integrally joined together at areas not contacted by the cladding metal, which comprises preparing a billet of the base metal and having a sealed cavity therein, said cavity containing a powdery compound of a metal element competent of dissolving into the base metal while the latter is in the solid state and of forming an alloy therewith, said compound being heat-decomposable at the hot-rolling temperature of the base metal and thereby liberating said metal element, heating the billet to hot-rolling temperature for the base metal and hot-rolling the billet whereby to extend the area and reduce the thickness of the billet metal and the powdery mixture, and therewith decompositon of the compound and transition of the elemental metal toward the walls of said cavity and the deposit of the said metal element at said walls, the billet and strip being maintained during the heating and hot-rolling for a time and at a temperature for effecting diffusion of atoms of the elemental metal into the base metal and forming an alloy therewith.

7. The method as in claim 6, in which an inert refractory resist powder is mixed with the heat-decomposable compound.

8. The method as in claim 6, in which the billet base metal is steel, and the heat decomposable compound is a nickel oxide.

9. The method as in claim 6, in which the billet base metal is steel and the heat-decomposable compound is an oxide of chromium.

10. The method as in claim 6, in which the billet base metal is steel, and the heat-decomposable compound is a chloride of chromium.

11. The method of producing a laminate strip having surface layers of steel with cladding alloy at inner surfaces thereof and having within the cladding layer of anti-welding material, said base metal layers being integrally joined together at areas not contacted by the cladding metal, which comprises preparing a steel billet having a sealed cavity therein, said cavity containing a powdery mixture of inert refractory powder and nickel oxide, heating the billet to hot-rolling temperature for the base metal and hot-rolling the billet whereby to extend the area and reduce the thickness of the billet metal and the powdery mixture, and therewith provoking decomposition of the nickel oxide and the deposit of the nickel metal on the walls of said cavity, the billet and strip being maintained during the heating and hot-rolling for a time and at a temperature for effecting diffusion of the nickel metal atoms into the steel and forming an alloy therewith.

12. The method of producing a laminate strip having surface layers of steel with cladding alloy at inner surfaces thereof and having within the cladding a layer of anti-welding material, said base metal layers being integrally joined together at areas not contacted by the cladding metal, which comprises preparing a steel billet having a sealed cavity therein, said cavity containing a powdery mixture of inert refractory powder with chromium metal and a chromium chloride, heating the billet to hot-rolling temperature for the base metal and hot-rolling the billet whereby to extend the area and reduce the thickness of the billet metal and the powdery mixure, and therewith provoking decomposition of the chromium chloride and the deposit of the chromium metal on the walls of the cavity, the billet and strip being maintained during the heating and hot-rolling for a time and at a temperature for effecting diffusion of the chromium metal atoms into the steel and forming an alloy therewith.

References Cited in the file of this patent

UNITED STATES PATENTS

| | | |
|---|---|---|
| 377,317 | Marshall | Jan. 31, 1888 |
| 1,955,547 | Ingersoll | Apr. 17, 1934 |
| 2,463,342 | Wiczer | Mar. 1, 1949 |

FOREIGN PATENTS

| | | |
|---|---|---|
| 160,812 | Australia | Jan. 28, 1955 |
| 749,056 | Great Britain | May 16, 1956 |